United States Patent [19]
Parkhurst et al.

[11] 3,886,272
[45] May 27, 1975

[54] SAPONIN-CONTAINING SPERMATOCIDAL COMPOSITIONS

[75] Inventors: Robert M. Parkhurst, Redwood City; Sidney J. Stolzenberg, Palo Alto, both of Calif.

[73] Assignee: Stanford Research Institute, Menlo Park, Calif.

[22] Filed: Apr. 5, 1974

[21] Appl. No.: 458,164

Related U.S. Application Data

[63] Continuation-in-part of Ser. No. 384,101, July 30, 1973, abandoned.

[52] U.S. Cl................................. 424/180; 260/210
[51] Int. Cl.² ........................................... A01N 9/00
[58] Field of Search..................... 260/210; 424/180

[56] References Cited
UNITED STATES PATENTS
3,442,911   5/1969   Baxendale........................... 424/180

Primary Examiner—Elbert L. Roberts
Attorney, Agent, or Firm—Donovan J. De Witt

[57] ABSTRACT

Saponins of the type found in Phytolacca dodecandra and Calendula officinalis are found to have utility as spermatocides and as antiblastocyst and abortion agents, they manifesting such activity either when employed in extract form or in the form of compounds having the structure of those found in said extracts. They are of low mammalian toxicity and have evidenced no significant topical irritation on being introduced into the vaginal cavity of the test animals or when applied to abraded or unabraded rabbit skin. These saponins are totally efffective even at low concentration in inducing substantially instantaneous inactivation of both human and animal sperm, and upon interuterine administration they are also capable of destroying blastocysts both before as well as after implantation.

15 Claims, No Drawings

SAPONIN-CONTAINING SPERMATOCIDAL COMPOSITIONS

RELATED APPLICATION

This application is a continuation-in-part of application Ser. No. 384,101 filed July 30, 1973 and now abandoned.

SUMMARY OF INVENTION

Saponins of the type found in *Phytolacca dodecandra* (endod berries) and *Calendula officinalis* (marigold plants) have utility as spermatocides, antiblastocysts and abortion agents. These saponins are made up of compounds having the following structure:

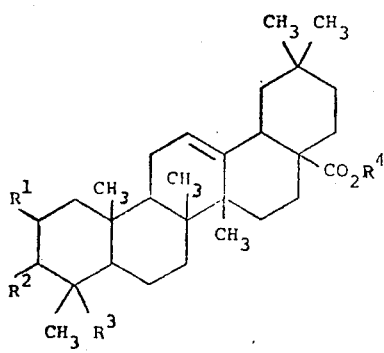

wherein $R^1$ is hydrogen or hydroxyl, $R^2$ is a saccharide unit made up of from two to five sugar moieties selected from the group consisting of glucose, xylose, arabinose, galactose and rhamnose, $R^3$ is methyl or hydroxymethyl and $R^4$ is hydrogen or a glucose sugar moiety.

The saponins found in P. dodecandra are saccharide derivatives of oleanolic acid, bayogenin, hederogenin or 2-hydroxyoleanolic acid. These latter compounds all possess the general structure shown above (I), the particular nature of the several $R^1$, $R^3$ and $R^4$ groups present in each of the said compounds being shown in Table 1 below. In turn, the saponins of C. officinalis are saccharide derivatives of oleanolic acid except that with some of these saponins the ($R^4$) hydrogen group of oleanolic acid is replaced by a glucose moiety such as in structures II and IV and VIII.

Table 1

|  | $R^1$ | $R^3$ | $R^4$ |
|---|---|---|---|
| Oleanolic acid | H | $CH_3$ | H |
| Bayogenin | OH | $CH_2OH$ | H |
| Hederogenin | H | $CH_2OH$ | H |
| 2-hydroxyoleanolic acid | OH | $CH_3$ | H |

The ($R^2$) saccharide group present on the saponins derived from C. officinalis takes one or another of the following forms:

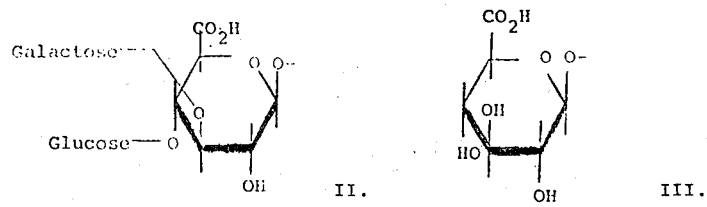

II.            III.

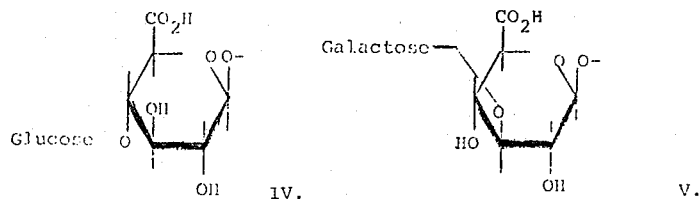

IV.            V.

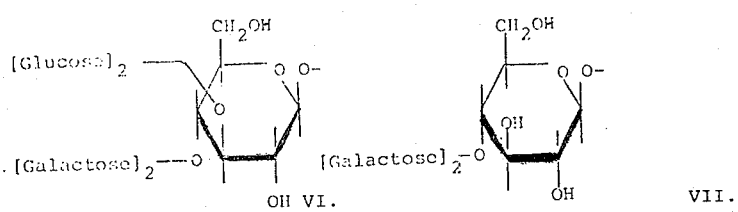

VI.            VII.

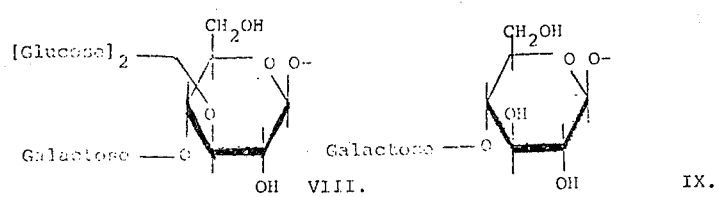

VIII.            IX.

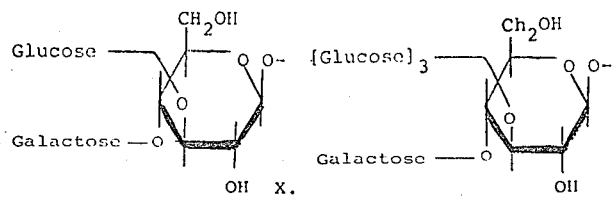

The (R²) saccharide group present on the saponins derived from P. dodecandra takes one or another of the following forms:

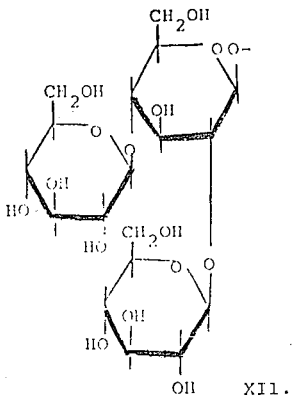

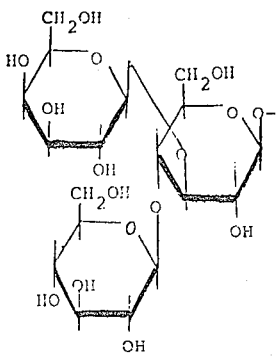

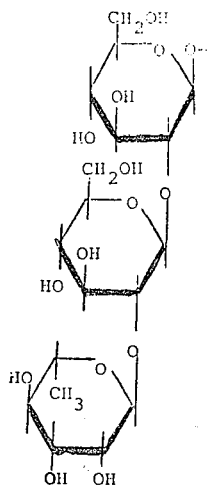

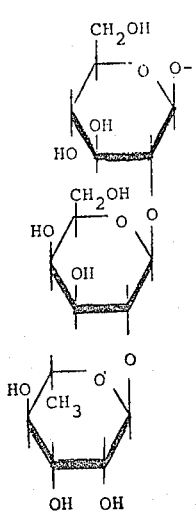

In the structures shown above (II − XV), the unattached valences represent hydrogen atoms.

The saccharide units illustrated by formulae XII, XIII, XIV and XV are variously associated with one or another of the compounds oleanolic acid, bayogenin, hederogenin and 2-hydroxy oleanolic acid. Thus, one fraction recovered by chromatographic separation of a butanol extract of endod berries, which is described in Example 2 below, is made up of approximately 86 percent of a saponin in which oleanolic acid is associated with the saccharide of structure XII, with 11 percent representing hederogenin associated with this same saccharide unit. The first of these compounds can be designated as 3-0-[2,4-di-0-($\beta$-D-glucopyranosyl)-$\beta$-D-glucopyranosyl]-olean-12-ene-28-oic acid. It is also designated, hereinafter, as oleanoglycotoxin-A. This work is published in Phytochemistry 12 1437 (1973). The hederogenin-based compound can be designated as 3-0-[2,4-di-0-($\beta$-D-glucopyranosyl)-$\beta$-D-glucopyranosyl]-23-hydroxyolean-12-ene-28-oic acid.

Similarly, another fraction resulting from the same chromatographic separation, which is described in Example 3, consists of at least about 98 percent of a saponin in which oleanolic acid is associated with the saccharide of structure XIII. This compound may be termed 3-0-[4'-0-($\beta$-D-glucopyranosyl)-3'-0-($\beta$-D-galactopyranosyl)-$\beta$-D-glucopyranosyl]-olean-12-ene-28-oic acid. It is also designated as oleanoglycotoxin-B or as lemmatoxin, see Canadian J. Chem. 52 702 (1974).

Still another fraction recovered from the same chromatographic separation procedure, which is described in Example 4, is made up of a mixture of saponins in which oleanolic acid is associated with the saccharide of structure XIV, (70 percent), together with that in which oleanolic acid is associated with the saccharide of structure XV. These compounds can be termed 3-0-{2'-0-[2''-0-($\alpha$-L-rhamnopyranosyl)-$\beta$-D-glucopyranosyl]-$\beta$-D-glucopyranosyl} olean-12-ene-28-oic acid and 3-0-[2'-0-[2''-0-($\alpha$-L-rhamnopyranosyl-$\beta$-D-galactopyranosyl]-$\beta$-D-glucopyranosyl] olean-12-ene-28-oic acid, respectively. The mixture is also designated as oleanoglycotoxin-C or as lemmatoxin-C, see Indian J. Chem. (1974) in press.

For a discussion of the particular saponins recovered by solvent extraction from the C. officinalis, reference is made to the articles by Zofia Kasprzyk and Zdzislaw Wojciechowski, "The Structure of Triterpenic Glycosides from the Flowers of Calendula Officinalis L.," Phytochemistry, Vol. 6, pp. 69–75 (1967), and, "The Structure of Glycosides of Oleanolic Acid Isolated from the Roots of Calendula Officinalis," Phytochemistry, Vol. 10, pp. 1121–1124 (1971) (Pergamon Press, printed in England).

Saponin- containing extracts useful in inactivating sperm or inducing abortion in man or animals can be obtained from either endod berries or or marigold plants (using one or more of the flower, stem, leaf or root portions thereof) by conventional extraction procedures. For example, dried raw material may first be ground and then treated with fat solvent such as petroleum ether or diethyl ether to remove fatty constituents. The defatted material is then extracted one or more times with warm water. Following removal of solids by centrifugation there may be obtained a clear, brown solution of the desired saponin materials. This aqueous solution may then be extracted one or more times with an appropriate alcohol such as 3-pentanol, 1-hexanol, 2-nexanol or 1-heptanol, and preferably with 1-butanol (n-butanol). Upon evaporation of the solvent and further washing with ether, the desired product is obtained as a light tan powder (in the case of endod berries) or as a somewhat darker brown powder as obtained either from marigold flowers or from whole marigold plants. A modified endod procedure of this character is described by Aklilu Lemma, Gerald Brody, Gordon W. Newell, R. M. Parkhurst and W. A. Skinner, "Studies of the Molluscicidal Properties of Endod (Phytolacca Dodecandra): I. Increased Potency with Butanol Extraction," The Journal of Parasitology, Vol. 58, No. 1, pp. 104–107, (February 1973).

DESCRIPTION OF PREFERRED EMBODIMENTS

The following examples are variously illustrative of the preparation of saponin fractions and of the manner in which the said fractions may be employed to effect the methods of the present invention:

EXAMPLE 1

Preparation of Aqueous, Freeze-dried, and n-Butanol Extracts of Endod Berries; Preparation of n-Butanol Extract of Whole Marigold Plants; Preparation of n-Butanol Extracts of Marigold Flowers.

Endod berries, collected from wild plants in Ethiopia, were sun-dried for 2 to 3 days, ground to a fine powder, and used as stock material. To obtain 5 kg of this extract, 24 kg of ground berries were extracted with 80 liters of light petroleum ether by percolation. Evaporation in vacuo of the petroleum ether gave about 200 g of a green wax. The defatted material was extracted twice with 200 liters of warm water; the mixture being allowed to stand overnight with each extraction. Solids were removed by centrifugation to yield 400 liters of a clear, brown aqueous solution of the extracted saponins. The inactive solid residue (about half of the weight of the original material) was discarded. An aliquot of this clear, brown water extract was freeze-dried in a vacuum and the resulting brown solid was used in certain of the biological tests described hereafter. The remaining aqueous solution was then extracted twice with 200 liters of n-butanol to obtain 5 kg of the saponin material upon evaporation of the alcohol. This product upon trituration with ethyl ether solidified to a tan powder representing the desired end product.

Using the same general procedures as described in the foregoing paragraph, n-butanol extracts were similarly prepared from whole, flowering, marigold plants, including the root portions thereof as well as from marigold flowers. In each case the marigold materials were thoroughly dried and then ground before being subjected to the defatting and saponin-extraction procedures. The dried saponin-containing powders obtained from these preparations assessed essentially the same characteristics as those obtained from endod berries except that while the endod spaonin powder had a light tan color that of the marigold material had a somewhat darker brown coloration.

EXAMPLE 2

Chromatographic Separation of Endod Saponin Powder 20 g of the endod saponin powder prepared in Example 1 from the butanol extract were admixed with acetic anhydride and pyridine to give a brown gummy product which was dissolved in tetrahydrofuran, passed through a short Florisil column, and evaporated in vacuo giving 19.55 g of an almost colorless, amorphous saponin acetate mixture. Isolation of acetate. As the next step, 2 g of this crude saponin acetate was chromatographed on a column (18 × 3 cm, 50 g Mallinckrodt SilicAR-CC7, 100-200 mesh) using $CHCl_3$-$Et_2O$ gradient elution and following the progress of the fractions with TLC on SilicAR-7GF plates. One fraction, 348 mg. eluted with 5 percent $Et_2O$ in $CHCl_3$, was further purified by repetitive chromatography on thick plates (SilicAR-7GF, $CHCl_3$-$Et_2O$,1:1) finally giving 41.6 mg of the acetate as a colorless glassy solid, $R_f$ 38–46 (SilicAR-7GF, $Et_2O$), $[\alpha]_D^{23}$ + 17.37± 4.35° ($c$ = 0.576, $CHCl_3$). (Found: C. 59.4; H. 7.19. Calc. for $C_{68}H_{98}O_{28}$: C. 59.89; H. 7.24 percent). MS and NMR analysis show this material to contain 86 percent of the acetate of oleanoglycotoxin-A and 11 percent of the acetate of 3-[2,4-di-O-($\beta$-D-glucopyranosyl)-$\beta$-D-glucopyranosyl]- 23-hydroxyolean-12-ene-28-oic acid. Deacetylation of acetate. The acetate (2.3 mg) was treated with an excess of MeOH-conc. $NH_4OH$ (1:1) at 50° for 12 hours, then evaporated. Extraction with n-BuOH, followed by evaporation, gave the biologically active saponin as a white powder. The preparation and structure determination of the faction described in Example 2 is set forth in detail in the article by R. M. Parkhurst, David W. Thomas, W. A. Skinner, and Lewis W. Cary, entitled "Molluscicidall Saponins of Phytolacca Dodecanra: Oleanoglycotoxin-A," Phytochemistry, Vol. 12, (6) pp. 1437 to 1442 (1973) (Pergamon Press. Printed in England).

EXAMPLE 3

Chromatographic Separation Endod Saponon Powder

In the same chromatographic procedure described above in Example 2, another fraction was discovered. In this operation, 2 g of the crude saponin acetate were chromatographed on a column (18 × 3 cm, 50 g; Mallinckrodt SilicAR-CC7, 100–200 mesh) using $CHCl_3$-ether gradient elution and following the progress of the fractionation with TLC on SilicAR-7GF plates. A fraction, 1015 mg, eluted with 1 percent ether in $CHCl_3$, was further purified by repetitive chromatography on thick plates (SilicAR-7GF, $CHCl_3$:ether, 1:1), finally giving 20.9 mg of a colorless glassy solid, $R_f$ 50-54 (SilicAR-7GF, ether), $[\alpha]_D^{23}$ = +7.38° (1.26 percent CHCl$_3$) which, as determined by MS analysis, was found to be made up of about 98 percent or more of the acetate of 3-0-[4'-0-($\beta$-D-glucopyranosyl)-3'-0-($\beta$-D-galactopyranosyl)-$\beta$-D-glucopyranosyl]-olean-12-ene-28-oic acid. 6.6 mg of the acetate was dissolved in 3 ml of methanol and 1 ml of conc. ammonium hydroxide and maintained at 50° for 24 hours. The solution was evaporated in a slow stream of nitrogen and extracted with n-butanol. Evaporation of the butanol gave the desired saponin fraction as a colorless solid.

EXAMPLE 4

Chromatographic Separation of Endod Saponin Powder

In the same chromatographic procedure described in Examples 2 and 3 above, still another fraction was discovered. In this operation, 2 g of the crude saponin acetates were chromatographed on a column (18×3 cm, 50 g, Mallinckrodt SilicAR-CC7, 100–200 mesh), using CHCl$_3$-ether gradient elution and following the progress of the fractionation via TLC on SilicAR-7GF plates. A fraction, 1015 mg, eluted with 1 percent ether in CHCl$_3$, was further purified by repetitive chromatography on thick plates (SilicAR-7GF CHCl$_3$, CHCl$_3$:ether (1:1), ether), finally giving 35.2 mg of the acetate as a colorless glassy solid, $R_f$ = 62–68 (SilicAR-7GF, ether), $[\alpha]_D^{23}$ = +11.87° (1.87 percent CHCl$_3$). This material was identified by NMR analysis as being made up of about 70 percent of the acetate of 3-0-{2'-0-[2''-0-($\alpha$-L-rhamnopyranosyl)-$\beta$-D-glucopyranosyl]-$\beta$-D-glucopyranosyl} olean-12-ene-28-oic acid and about 30 percent of the acetate of 3-0-{2'-0-[2''-0-($\alpha$-L-rhamnopyranosyl)-$\beta$-D-galactopyranosyl)-$\beta$-D-glucopyranosyl} olean-12-ene-28-oic acid. This acetate fraction was then deacetylated using the general method employed for this same purpose in Example 3 above.

The saponin fractions described in the foregoing examples were employed in connection with various sperm motility tests, as well as in other tests conducted on blastocysts. The methodology employed in these procedures was as follows:

Sperm Motility Tests

Rat epididymal sperm - Sperm were collected from a freshly decapitated 70–90 day old rat. Each epididymus was excised, cut and the sperm permitted to escape into 1 to 1.5 ml of tissue culture medium 199. Dilutions were adjusted to contain 1 to 1.5 million sperm per ml test. Test extracts and compounds were dissolved in and appropriately diluted with TC-199.

Human sperm tests - Sperm tests were performed within 1 to 4 hours after collection. Original sperm counts ranged from 42 to 176 million per cc. Dilutions of 1 cc of semen ranged from 9 to 15 ml in a modified Ringers solution. Test extracts and compounds were appropriately diluted with the same solution.

Incubation procedures - In tests with either rat or human sperm, 0.1 ml of each solution of the saponin under test was placed in a test tube measuring 10×75 mm. To each test tube, while undergoing shaking in Dubnoff shaker, 0.9 ml of diluted sperm solution was added. At appropriate intervals small amounts of sperm samples in each test tube were removed. Placed between a slide and cover slip for microscopic examination. Percent motility and in most cases the speed and vigor of motility (ranging from 1+ to 4+) were recorded.

The following examples present data obtained in carrying out one or another of the foregoing sperm motility tests, using given saponin portions prepared in accordance with Examples 1-4, as indicated:

EXAMPLE 5

The following data were obtained in conducting rat epididymal sperm tests using both a saponin-free control as well as others in which the n-butanol extract of endod berries, as described in Example 1, was employed in varying concentrations:

| Incubation Time Min. | Control | | 5 µg/ml | | 10 µg/ml | | 20 µg/ml | | 50 µg/ml | |
|---|---|---|---|---|---|---|---|---|---|---|
| | % | Grade | % | Grade | % | Grade | % | Grade | % | Grade |
| <3 | 60 | 4+ | 60 | 4+ | 60 | 4+ | 10 | 4+ | 0 | — |
| 15 | 50 | 3+ | 40 | 3+ | 30 | 2+ | 0 | — | 0 | — |
| 30 | 60 | 4+ | 25 | 2+ | 5 | 1+ | 0 | — | 0 | — |
| 60 | 50 | 3+ | 30 | 2+ | 10 | 1+ | 0 | — | 0 | — |
| 100 | 40 | 1+ | 40 | 2+ | 20 | 1+ | 0 | — | 0 | — |

EXAMPLE 6

The procedure of Example 5 is repeated except that the saponin fractions employed were those prepared as recited in Example 4.

EXAMPLE 7

The following data are those obtained on conducting human sperm tests using a control as well as various concentrations of the saponin fraction obtained by the n-butanol extraction of endod berries as recited in Example 1:

| Incubation Time Min. | Control | | 10 µg/ml | | 20 µg/ml | | 40 µg/ml | |
|---|---|---|---|---|---|---|---|---|
| | % | Grade | % | Grade | % | Grade | % | Grade |
| <3 | 70 | 4+ | 70 | 4+ | 10 | 4+ | 0 | — |
| 15 | 80 | 4+ | 40 | 4+ | 10 | 4+ | 0 | — |
| 30 | 70 | 4+ | 30 | 3+ | 10 | 3+ | 0 | — |
| 60 | 70 | 3+ | 30 | 3+ | 20 | 1+ | 0 | — |
| 90 | 50 | 3+ | 30 | 2+ | 20 | 1+ | 0 | — |
| 120 | 50 | 2+ | 5 | 2+ | 10 | 1+ | 0 | — |

EXAMPLE 8

The operation of Example 7 was repeated, but using the saponin fraction prepared in Example 3.

| Incubation Time Min. | Control | | 5 µg/ml | | 20 µg/ml | | 80 µg/ml | |
|---|---|---|---|---|---|---|---|---|
| | % | Grade | % | Grade | % | Grade | % | Grade |
| <3 | 70 | 4+ | 70 | 4+ | 40 | 4+ | 3 | 1+ |
| 15 | 70 | 4+ | 60 | 4+ | 40 | 4+ | 0 | — |
| 30 | 70 | 4+ | 40 | 4+ | 30 | 4+ | 0 | — |
| 60 | 60 | 4+ | 40 | 4+ | 30 | 4+ | 0 | — |
| 90 | 50 | 4+ | 40 | 4+ | 30 | 4+ | 0 | — |
| 120 | 50 | 4+ | 30 | 4+ | 30 | 4+ | 0 | — |

EXAMPLE 9

The operation of Example 7 was repeated, but using the freeze-dried, water extract of endod berries as described in Example 1.

| Incubation Time Min. | Control |  | 50 μg/ml |  | 200 μg/ml |  | 800 μg/ml |  |
|---|---|---|---|---|---|---|---|---|
|  | % | Grade | % | Grade | % | Grade | % | Grade |
| <3 | 70 | 4+ | 80 | 4+ | 2 | 3+ | 0 | — |
| 15 | 70 | 4+ | 70 | 4+ | 0 | — | 0 | — |
| 30 | 70 | 4+ | 60 | 4+ | 0 | — | 0 | — |
| 60 | 70 | 4+ | 60 | 4+ | 0 | — | 0 | — |
| 90 | 60 | 4+ | 60 | 4+ | 0 | — | 0 | — |
| 120 | 60 | 4+ | 60 | 4+ | 0 | — | 0 | — |

EXAMPLE 10

The operation of Example 7 was repeated, but using n-butanol extract of whole marigold flowers as described in Example 1.

| Incubation Time Min. | Control |  | 20 μg/ml |  | 100 μg/ml |  | 500 μg/ml |  |
|---|---|---|---|---|---|---|---|---|
|  | % | Grade | % | Grade | % | Grade | % | Grade |
| <3 | 60 | 4+ | 60 | 4+ | 30 | 2+ | 0 | — |
| 15 | 60 | 4+ | 60 | 4+ | 5 | 3+ | 0 | — |
| 30 | 60 | 4+ | 50 | 4+ | 0 | — | 0 | — |
| 60 | 50 | 4+ | 50 | 4+ | 0 | — | 0 | — |
| 90 | 60 | 4+ | 50 | 4+ | 0 | — | 0 | — |
| 120 | 50 | 4+ | 50 | 4+ | 0 | — | 0 | — |

EXAMPLE 11

The operation of Example 7 was repeated, but using n-butanol extract of whole marigold plants as described in Example 1.

| Incubation Time Min. | Control |  | 20 μg/ml |  | 100 μg/ml |  | 500 μg/ml |  |
|---|---|---|---|---|---|---|---|---|
|  | % | Grade | % | Grade | % | Grade | % | Grade |
| <3 | 60 | 4+ | 70 | 4+ | 70 | 4+ | 0 | — |
| 15 | 60 | 4+ | 70 | 4+ | 60 | 4+ | 0 | — |
| 30 | 60 | 4+ | 70 | 4+ | 50 | 4+ | 0 | — |
| 60 | 50 | 4+ | 60 | 4+ | 60 | 4+ | 0 | — |
| 90 | 60 | 4+ | 70 | 4+ | 60 | 4+ | 0 | — |
| 120 | 50 | 4+ | 70 | 4+ | 60 | 4+ | 0 | — |

EXAMPLE 12

The operation of Example 7 was repeated except using the saponin fraction prepared in Example 2.

| Incubation Time Min. | Control |  | 40 μg/ml |  | 80 μg/ml |  | 100 μg/ml |  | 400 μg/ml |  |
|---|---|---|---|---|---|---|---|---|---|---|
|  | % | Grade | % | Grade | % | Grade | % | Grade | % | Grade |
| <3 | 50 | 4+ | 50 | 4+ | 60 | 4+ | 50 | 4+ | 0 | — |
| 15 | 60 | 4+ | 50 | 4+ | 40 | 4+ | 50 | 4+ | 0 | — |
| 30 | 60 | 4+ | 50 | 4+ | 40 | 4+ | 30 | 4+ | 0 | — |
| 60 | 60 | 4+ | 50 | 4+ | 50 | 4+ | 40 | 4+ | 0 | — |
| 90 | 60 | 4+ | 60 | 4+ | 50 |  |  | 30 | 4+ | 0 | — |
| 120 | 50 | 4+ | 50 | 4+ | 20 | 4+ | 25 | 4+ | 0 | — |

EXAMPLE 13

Termination of Pregnancy Before Blastocyst Implantation

Nine- to ten-week-old nonparous female rats were coupled with males whose fertility had been proven by a commercial breeder. The following day was designated Day 1 of pregnancy if vaginal sperm or plugs were observed. Bilateral ovariectomies were performed on most rats on Day 3 and on a few on Day 4 of pregnancy.

Pregnancy was maintained, but implantation was prevented by subcutaneous injections of 2 mg of progesterone per day for 2 or 3 days. On the day following the last injection, the uterus was exteriorized by a midventral incision, and either the *Phytolacca dodecandra* butanol extract of Example 1 or the oleanoglycotoxin-B was injected into each uterine horn by means of a 1-ml tuberculin syringe and a 27-gauge needle. Following intrauterine injection, the animals received 1 μg of estrone and 2 or 4 mg of progesterone in 0.1 or 0.2 ml of sesame oil for 3 or 4 days to induct implantation and maintain pregnancy. On the day following the last injection, the rats were sacrificed, and viable fetuses or implantation sites were counted and recorded.

EFFECT OF (A) THE MIXTURE OF SAPONINS IN THE BUTANOL EXTRACT OF *P. DODECANDRA* AND (B) OF OLEANOGLYCOTOXIN-B, ON PREGNANCY BEFORE BLASTOCYST IMPLANTATION

| Group | Intrauterine Injection | | No. Pregnant/ No. Treated | Average No. Fetuses in Pregnant Animal |
|---|---|---|---|---|
| | mg/Horn | Substance* | | |
| 1 | 5 | Butanol extract | 0/2 | — |
| 2 | 2 | Butanol extract | 0/6 | — |
| 3 | 1 | Butanol extract | 2/3** | 6.5 |
| 4 | 1 | Oleanoglycotoxin-B | 1/3** | 4.0 |
| 5 | — | Control (saline) | 8/8 | 9.9 |

* Preparations used in Groups 1 to 4 were dissolved in saline, and 0.05 to 0.1 ml solutions were injected in utero.
**In each of these groups, there was one animal with fetuses in only one uterine horn. It has been reported that with intrauterine contraceptive devices (IUD), it is possible to prevent pregnancy in rats in only the horn that contains the IUD (Parr, Fertil. Steril. 17, 797, 1966).

The data of the foregoing table show that injections of the crude endod saponin extract or that of oleanoglycotoxin-B are highly effective in terminating pregnancy prior to the occurrence of implantation of the blastocysts in the rat.

EXAMPLE 14

Termination of Pregnancy After Blastocyst Implantation

The animals were prepared in the same manner as described above, with one difference. The 2-mg subcutaneous injections of progesterone administered for 3 days were followed by injections of 1 μg of estrone and 2 mg of progesterone for 2 days to induce implantation before the intrauterine injections of test material. The estrone/progesterone injections were continued for an additional 3 days, followed by autopsy on Day 12. The following results are obtained:

EFFECT OF A BUTANOL EXTRACT OF *P. DODECANDRA* ON PREGNANCY AFTER BLASTOCYST IMPLANTATION

| Group | Intrauterine Injection mg/Horn | Substance | No. Pregnant/ No. Treated | Average No. Fetuses in Pregnant Animal |
|---|---|---|---|---|
| 1 | 5 | Butanol extract | 1/5 | 13 |
| 2 | 2 | Butanol extract | 1/3 | 9 |
| 3 | — | Control (saline) | 6/6 | 9.8 |

| Group | No. with Implantation Sites*/No. Treated | Average No. Implantation Sites in Aborted Animals |
|---|---|---|
| 1 | 4/5 | 8.0 |
| 2 | 2/3 | 7.7 |
| 3 | 0/6 | — |

*Implantation sites represent the points of blastocyst attachment to the uterine endometrium of animals in which pregnancy was terminated.

The data of the foregoing table show that the crude saponin extract of endod berries are capable of terminating pregnancy in the rat after implantation of the blastocysts has occured.

We claim:

1. As a spermatocide adapted to be introduced into the vagina prior to intercourse and thus prevent the occurrence of pregnancy, a composition comprising at least one spermatocidally active saponin material having the structure

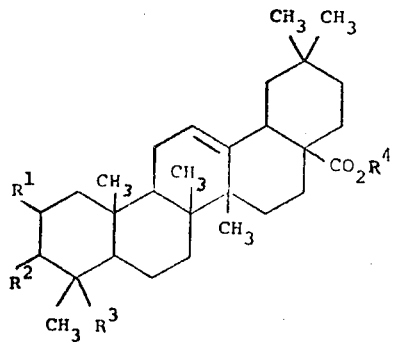

wherein $R^1$ is hydrogen or hydroxyl, $R^2$ is a saccharide unit made up of from two to five sugar moieties selected from the group consisting of glucose, xylose, arabinose, galactose and rhamnose, $R^3$ is methyl or hydroxymethyl and $R^4$ is hydrogen or a glucose sugar moiety.

2. The composition of claim 1 wherein the saponin material represents an extract obtained from endod berries.

3. The composition of claim 1 wherein the saponin material represents an extract obtained from marigold plants.

4. The composition of claim 1 wherein the saponin material represents oleanoglycotoxin-A.

5. The composition of claim 1 wherein the saponin material represents 3-0-[4'-0-(β-D-glucopyranosyl)-3'-0-(β-D-galactopyranosyl)-β-D-glucopyranosyl]-olean-12-ene-28-oic acid.

6. The composition of claim 1 wherein the saponin material represents 3-0-{2'-0-[2''-0-(α-L-rhamnopyranosyl)-β-D-glucopyranosyl]-β-D-glucopyranosyl} olean-12-ene-28-oic acid.

7. The composition of claim 1 wherein the saponin material represents 3-0-{2'-0-[2''-0-(α-L-rhamnopyranosyl)-β-D-galactopyranosyl]-β-D-glucopyranosyl} olean-12-ene-28-oic acid.

8. The method of preventing the occurrence of pregnancy in a mammal which comprises introducing into the vagina, prior to intercourse, a spermatocidally effective dosage of a composition comprising at least one spermatocidally active saponin material having the structure

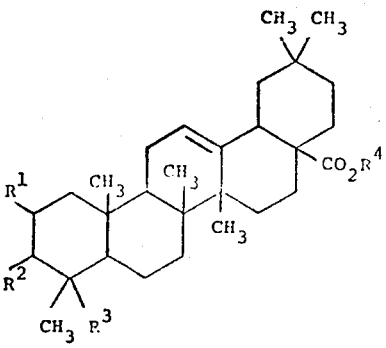

wherein $R^1$ is hydrogen or hydroxyl, $R^2$ is a saccharide unit made up of from two to five sugar moieties selected from the group consisting of glucose, xylose, arabinose, galactose and rhamnose, $R^3$ is methyl or hydroxymethyl and $R^4$ is hydrogen or a glucose sugar moiety.

9. The method of claim 8 wherein the saponin material has the structure of that extractable from endod berries.

10. The method of claim 8 wherein the saponin material has the structure of that extractable from marigold plants.

11. The method of claim 8 wherein the saponin material is oleanoglycotoxin-A.

12. The method of claim 8 wherein the saponin material is 3-O-[4'-O-(β-D-glucopyranosyl)-3'-O-(β-D-galactopyranosyl)-β-D-glucopyranosyl]-olean-12-ene-28-oic acid.

13. The method of claim 8 wherein the saponin material is 3-O-{2'-O-[2''-O-(α-L-rhamnopyranosyl)-β-D-glucopyranosyl]-β-D-glucopyranosyl} olean-12-ene-28-oic acid.

14. The method of claim 8 wherein the saponin material is 3-O-{2'-O-[2''0-O-(α-L-rhamnopyranosyl)-β-D-galactopyranosyl]-β-D-glucopyranosyl} olean-12-ene-28-oic acid.

15. The method of terminating pregnancy in a mammal following conception either before or after blastocyst implantation, which comprises introducing into the uterus of said mammal an amount effective to terminate pregnancy of a composition comprising at least one saponin material having the structure

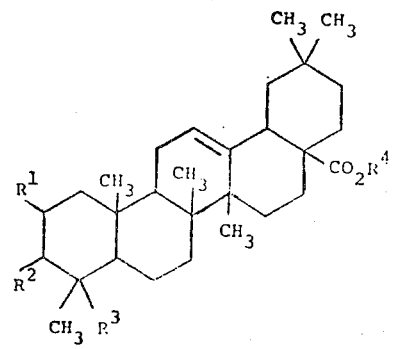

wherein $R^1$ is hydrogen or hydroxyl, $R^2$ is a saccharide unit made up of from two to five sugar moieties selected from the group consisting of glucose, xylose, arabinose, galactose and rhamnose, $R^3$ is methyl or hydroxymethyl and $R^4$ is hydrogen or a glucose sugar moiety.

* * * * *